March 22, 1955 T. P. PAJAK 2,704,587
SHORT RADII BENDS IN HONEYCOMB SANDWICH STRUCTURES
Filed March 4, 1950

INVENTOR.
THEODORE P. PAJAK,
BY
ATTORNEY

United States Patent Office 2,704,587
Patented Mar. 22, 1955

2,704,587

SHORT RADII BENDS IN HONEYCOMB SANDWICH STRUCTURES

Theodore P. Pajak, Baltimore, Md., assignor to The Glenn L. Martin Company, Middle River, Md., a corporation of Maryland Application March 4, 1950, Serial No. 147,597

5 Claims. (Cl. 189—34)

This invention relates to honeycomb sandwich construction for use in thin, lightweight airfoils and other hollow bodies having relatively short radius of curvature.

Sandwich material comprising honeycomb core with reinforcing skins secured to the open celled surfaces thereof provides a much stronger, lighter, and more rigid structure than any structural mass distribution known. The advantages of this type of construction especially for aircraft may conceivably revolutionize the industry when workable methods have been devised for producing the shapes and contours necessary for unrestricted design. This invention discloses a solution of the problem of producing short radii bends in sandwich structures.

Sandwich material must be shaped in a special manner and sequence of operations in order to prevent secondary stresses and warping from ruining the part. The physical action of honeycomb material upon bending is unpredictable from the theoretical treatments commonly in use. Because of the difficulty in producing complex shapes, up to the time of this invention, the use of sandwich construction was limited to substantially flat surfaces. If the sandwich material was forced to a desired shape it would either tear the reinforcing skin or crush the honeycomb core before yielding appreciably. If the honeycomb core and reinforcing skins were simply formed separately, the core would warp, crimp or tear before any reasonably short radius was obtained.

It is an object of this invention to allow short radii curved sections to be easily formed using honeycomb sandwich construction.

It is an object of this invention to produce a structure stronger and more rigid than could otherwise be produced by the same quantity of the same material.

It is another object of this invention to facilitate the use of honeycomb sandwich construction.

It is another object of this invention to increase the strength of sandwich construction at areas of greater curvature or higher stress.

Another object of this invention is to provide a construction especially adapted to high-speed airfoils which will virtually eliminate structural difficulties heretofore encountered in conventional designs.

Further and other objects will become apparent from the accompanying description and drawings which form a part of this disclosure and in which like numerals refer to like parts.

The method of forming sharp radii bends in sandwich material without incurring secondary stresses, warping or outright failure of the components is a definite accomplishment in the development and use of this new honeycomb construction. As herebelow described, this procedure for producing short radii bends begins with laying out the flat core and reinforcing skins so that when formed they will have the approximate proper dimensions.

Figure 1:
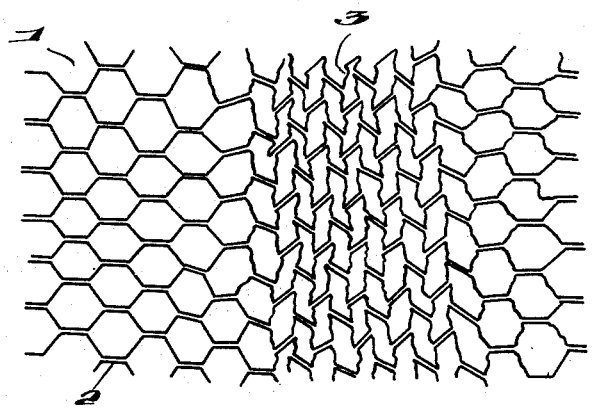
Figure 1 is a plan view of the honeycomb core locally densified but not formed.

The next and probably the most important act in the sequence is shown in Figure 1 using honeycomb core material 1, comprising a plurality of very thin strips of aluminum foil (.002 to .006 inch in thickness) formed as to make hexagonal cells when bonded together. This method of making core material 1 produces double thickness walls 2 on two sides of each of the many cells, which are parallel to all the other double walled sides throughout the core prior to any deformation thereof. The spacing between double thickness walls 2 as shown in the drawings is merely for the purpose of better illustrating the construction wherein the walls are actually bonded together. Core material 1 is placed on a flat surface with double walled sides 2 of the hexagonal cells being parallel to the proposed line of curvature. The hexagonal cell walls of honeycomb core 1 are then collapsed, as shown at 3 in Figure 1, by compression forces applied generally parallel to the longitudinal direction of the double thickness walls 2 and generally perpendicular to the cells axes, in areas of the greater curvature as determined from consideration of the final shape desired. An interesting phenomenon occurs during the compression of the cell walls in that substantially no lateral increase in dimensions is evident when the compression force is applied parallel to the longitudinal direction of the double thickness walls 2 of the cells in core 1, but a definite increase in lateral dimensions does appear when a compression force is applied perpendicular to the longitudinal direction of the double thickness walls 2, explaining why the core is handled as described. This collapsing of the cell walls brings about a structure as shown in the central portion of Fig. 1 such that the walls of the cells have a crumpled configuration including deformations and wrinkles extending generally parallel to the cell axis resulting in a sharp reduction of cell volume and a corresponding reduction in the ratio of volume to cell wall area, since the latter remains the same. This crumpling or crinkling of the cell walls is essentially monodirectional and no change in the cell length in the direction of its axis, i. e., in the direction of panel thickness, is brought about by the collapsing action described.

Figure 3:
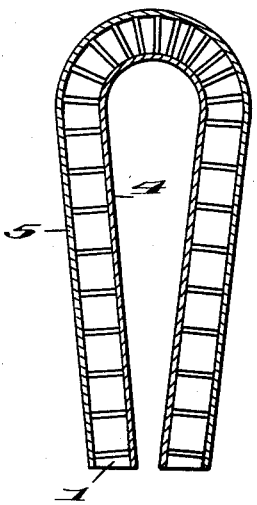
Figure 3 is a sectional end view of the sandwich construction of densified honeycomb core and reinforcing skins secured to the open celled surfaces, showing a typical bend radius.
Figure 2:
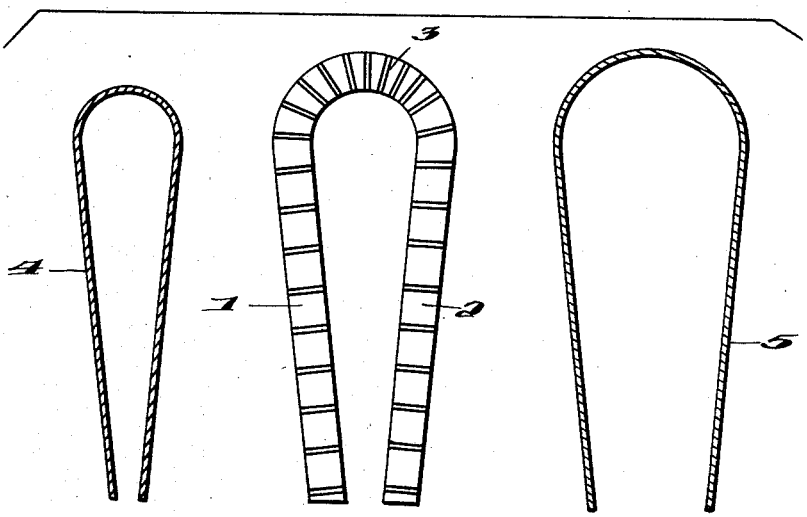
Figure 2 is a sectional end view of the two reinforcing skins and the locally densified honeycomb core, formed but unassembled.

Following the act of collapsing the cell walls, usually referred to as densifying, as shown in Figure 1, core 1 is easily formed to the final curvature as shown in Figure 2. Reinforcing skins 4 and 5 of metal or the equivalent are then formed to mate the inside and outside open celled surfaces of formed core 1. Next, a thermosetting adhesive compound is applied to all adjoining surfaces, and allowed to partially cure at room temperature, usually for a period of 16 to 48 hours, and then the two skins 4 and 5 are assembled with core 1 sandwich therebetween. Holding the parts in proper relation to one another and in the final desired shape as shown in Figure 3, the sandwich material is placed in an oven and heated until the adhesive reaches its maximum strength, at which time the part is allowed to cool. When the part is sufficiently cooled it is ready for use wherever a light and rigid, yet strong structure is required.

A structure such as the leading edge of a wing embodying the construction herein disclosed, results in a design efficiency unequalled for strength-weight considerations. The material being located adjacent the outer wing surface, leaves a sizable hollow portion in which control mechanisms and other equipment may be located. This feature is most important in the design of electronically controlled aircraft such as guided missiles which must accommodate a great amount of equipment in a small space. Though this wing construction is intended for use in high-speed airfoils, it has many other applications, some completely alien to the aircraft industry.

While in the drawing the method has been illustrated as being applied to the formation of a structure having a single degree of curvature, it is obvious that panels of compound curvature can be as readily and effectively formed by this same method.

The honeycomb core being densified at short radii curves, or at other desirable portions adds strength at areas of higher stress allowing a very practical design with no useless, weighty material where it isn't needed.

The thickness of skins 4 and 5 shown in the drawings are merely for illustrative purposes, and in no sense are they intended to limit the invention as set forth in this specification. The skins may be of any desirable thickness depending upon the specific application of the structure and secured to the core with any suitable adhesive.

It is to be understood that certain changes, alterations, modifications and substitutions can be made without departing from the spirit and scope of the appended claims.

I claim as my invention:

1. A method of making sharply curved structural panels of honeycomb sandwich material using a slab of honeycomb core of open-ended cellular construction with the walls and axes of the individual cells arranged substantially normal to the plane of said slab and reinforcing skins comprising, densifying said core by collapsing the cells thereof in areas to be formed to a short radius curvature in a direction perpendicular to the cell axes forming said core and skins to shape before assembly, then securing said skins to the open celled surfaces of said core to produce a strong, rigid, and lightweight structure.

2. A method of making sharply curved structural panels of cellular core and stiffening outer skin construction wherein the cell walls and axes are substantially normal to the skins comprising, collapsing the cell walls of said cellular core substantially parallel to the plane of said core in predetermined areas to be formed to a short radius curvature, then forming said core to the desired shape about an axis normal to said cell axes, and forming said skins to shapes complementary to said core shape, assembling the formed core and skins in their complementary relationship, interposing a layer of thermosetting adhesive between the adjoining surfaces of said core and skins, and then holding said core and skins in proper contour and relationship while curing said adhesive.

3. A method of making a sharply curved honeycomb sandwich panel which comprises selecting a slab of honeycomb core material comprised of a plurality of open-ended cells of predetermined cross sectional shape and size and having their walls and axes arranged generally perpendicular to the plane of said slab, densifying said core material in the area to be sharply curved by partially collapsing the cells in said area in the direction parallel to said plane and normal to the desired axis of curvature, bending the core material in said densified area to the desired curvature about an axis normal to said cell axes, and securing to the opposed surfaces of said curved core correspondingly curved surface sheets.

4. A honeycomb core material for use in the making of sharply curved honeycomb sandwich constructions comprising a panel of a low-density metal core including a plurality of open-ended cells whose axes extend through said panel between opposite faces thereof and having their walls generally normal to said faces, the walls of the cells, at least in the portion of the panel to be curved, having a crumpled configuration such that the resulting wall wrinkles extend generally parallel to the cell axes, said cells with walls of crumpled configuration having substantially the same extent axially of the cell as the uncrumpled cell, and having a volume to cell wall area ratio sharply reduced from the maximum value possible for the cell wall areas involved.

5. A sandwich construction comprising honeycomb sandwich material, a portion of which is formed to a short radius curvature, said sandwich material including a low-density, metal core having inner and outer surfaces, said core having a plurality of open ended cells which normally have a maximum volume to cell wall area ratio, the axes of said cells being generally perpendicular to said inner and outer surfaces, said core material extending around said curved portion, the cells in said curved portion having walls with a crumpled configuration such that the resulting wall wrinkles extend generally parallel to the cell axes, said cells in the curved portion having substantially the same extent axially of the cell as the uncrumpled cell, and having a volume to cell wall area ratio sharply reduced from the normal maximum value, the cell walls in said curved portion extending substantially radially from the axis of curvature, and inner and outer skins conforming in curvature with the inner and outer surfaces of said core and securely bonded thereto and forming unitary structure therewith.

References Cited in the file of this patent

UNITED STATES PATENTS

| Number | Name | Date |
|---|---|---|
| 1,479,279 | Broido | Jan. 1, 1924 |
| 1,674,974 | Lorenz | June 26, 1928 |
| 2,212,481 | Sendzimir | Aug. 20, 1940 |
| 2,299,614 | Deutsch | Oct. 20, 1942 |
| 2,323,216 | Goldschmidt | June 29, 1943 |
| 2,333,343 | Sendzimir | Nov. 2, 1943 |
| 2,371,847 | Saunders | Mar. 20, 1945 |
| 2,417,733 | Booth | Mar. 18, 1947 |
| 2,429,144 | Watter | Oct. 14, 1947 |
| 2,451,454 | Watter | Oct. 12, 1948 |
| 2,481,046 | Scurlock | Sept. 6, 1949 |
| 2,576,698 | Russum | Nov. 27, 1951 |

FOREIGN PATENTS

| Number | Country | Date |
|---|---|---|
| 894,498 | France | Mar. 13, 1944 |
| 577,705 | Great Britain | May 29, 1946 |

OTHER REFERENCES

"Dufaylite," British Plastics, July, 1946, pages 327–329.

Plastics (London), "Honeycomb Sandwich Construction," Oct. 1949, pages 64–66.